Patented Sept. 29, 1925.

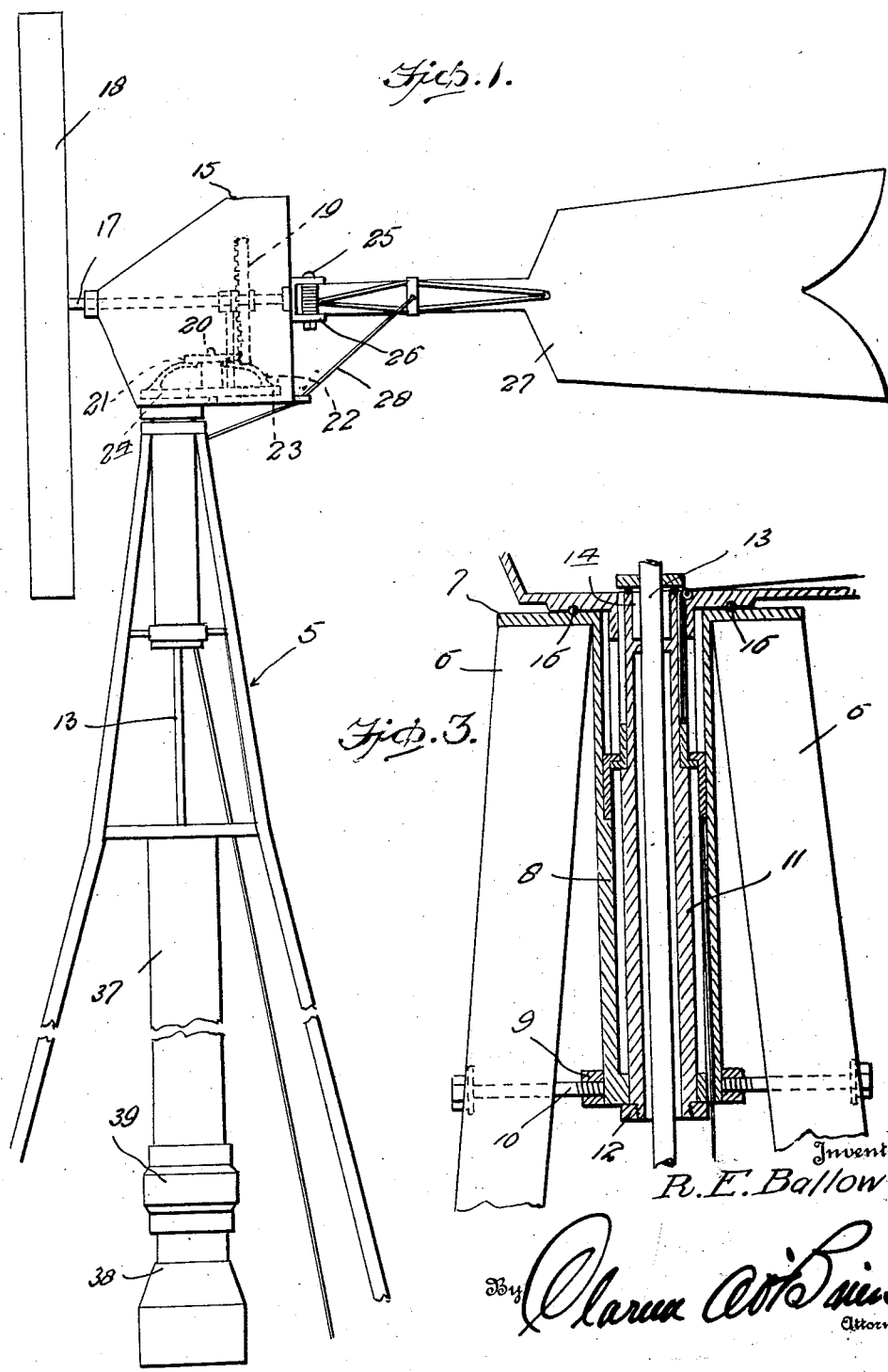

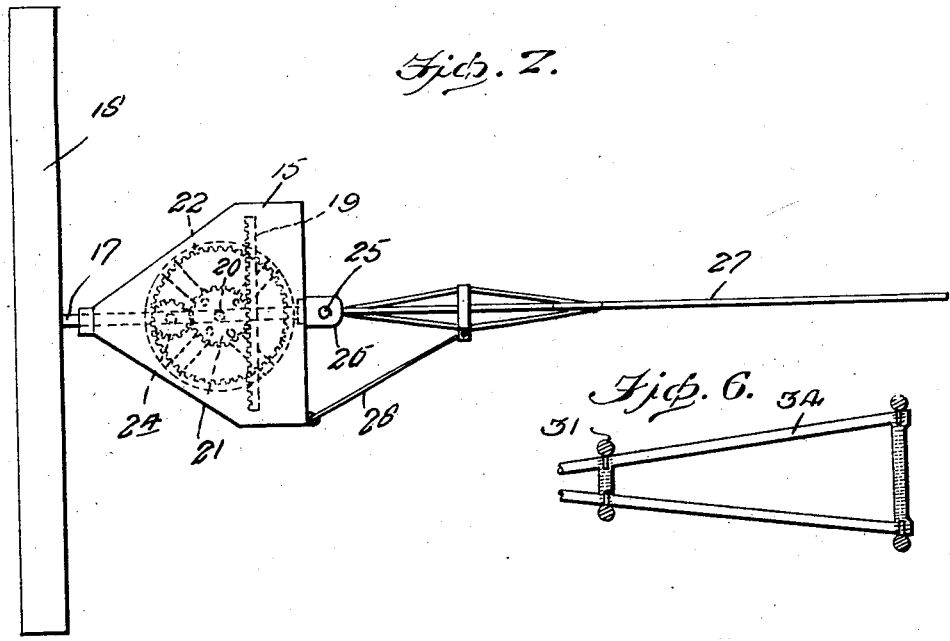

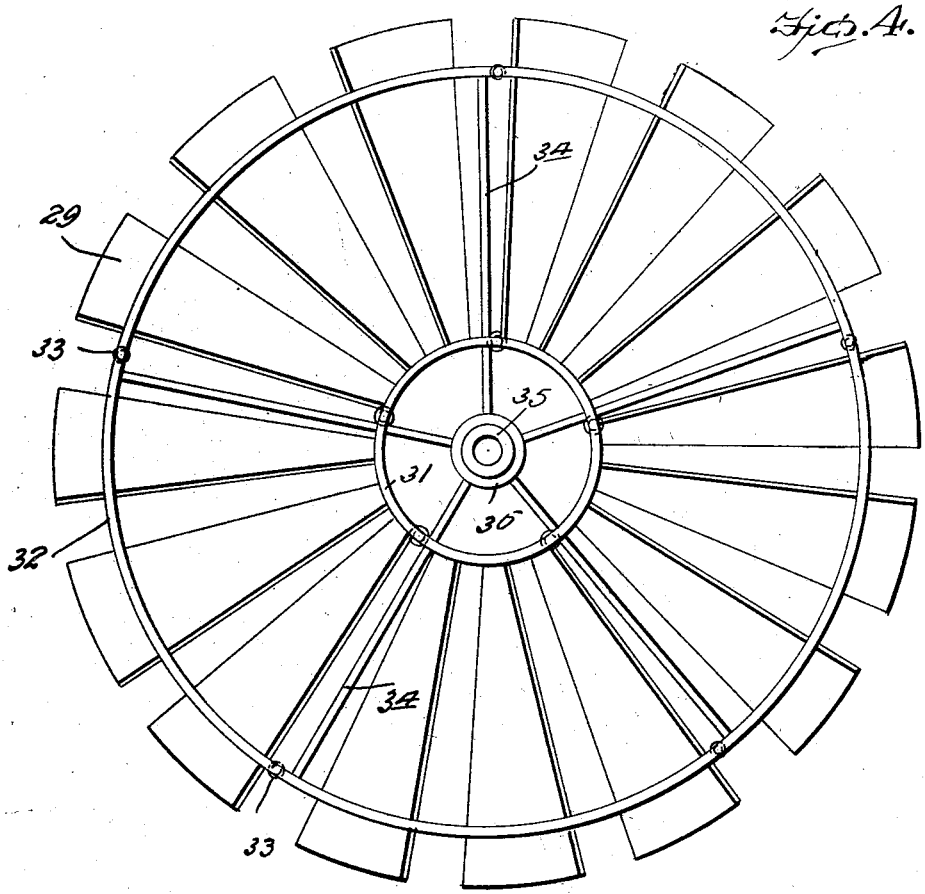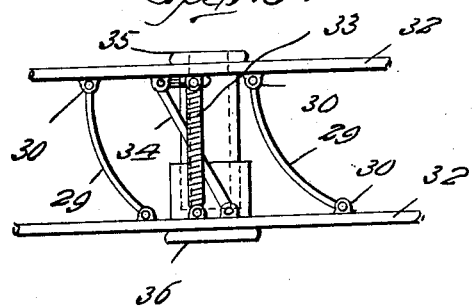

1,555,349

UNITED STATES PATENT OFFICE.

ROBERT E. BALLOW, OF ESTANCIA, NEW MEXICO.

WINDMILL PUMP.

Application filed August 16, 1923. Serial No. 657,683.

*To all whom it may concern:*

Be it known that I, ROBERT E. BALLOW, a citizen of the United States, residing at Estancia, in the county of Torrance and State of New Mexico, have invented certain new and useful Improvements in Windmill Pumps, of which the following is a specification.

In carrying out the present invention it is my purpose to provide a highly novel, simple and durable form of wind mill pump wherein the pump per se is of the suction type and is adapted to be actuated by an improved wind mill construction the nature of this wind mill construction being such as to operate said pump at relatively high speeds even though the wind pressure be low.

A further purpose of the invention is to provide such a structure wherein the pump is extremely simple in construction and one that is of such a nature as to raise a relatively great volume of water in a minimum amount of time.

An additional purpose is the provision of such a wind mill pump wherein the wind mill structure per se embodies a wind wheel that is of an automatically adjustable nature, that is, one that will be automatically adjusted by various wind pressures for maintaining the pump at a uniform speed regardless of the wind pressure.

Other objects of the invention will become apparent as the nature of the same is better understood, the invention comprising the novel form, combination and arrangement of parts as set forth in the following specification, shown in the accompanying drawings and claimed.

In the drawings wherein like reference characters indicate corresponding parts throughout the several views, Figure 1 is a side elevational view of my improved wind mill pump, Figure 2 is a top plan view of the wind mill structure per se, there being shown in dotted lines a high speed gear mechanism for imparting relatively high speeds to the pump at low speed of the wind wheel, Figure 3 is an enlarged fragmentary cross section through a portion of the wind mill structure, Figure 4 is an enlarged front elevational view of the wind wheel of my improved wind mill structure, Figure 5 is a fragmentary side elevation thereof, and Figure 6 is an enlarged fragmentary cross sectional view taken through a portion of said wind wheel.

With specific reference to the drawings 5 indicates generally the skeleton supporting frame for the wind mill that embodies vertical posts 6. Positioned upon the upper ends of these posts 6 as more clearly shown in Fig. 3 is an annular flange 7 of a relatively elongated tubular element 8 that extends downwardly between said posts 6 and is positioned at its lower end within a collar 9 that is carried by the inner screw threaded ends of bolts 10 that are passed through longitudinal bores within said posts 6. Rigidly disposed within said tubular element 8 is an elongated sleeve 11 that extends through said tubular element 8 at its opposite ends the lower end of this sleeve being reduced and screw-threaded for receiving a jamb nut 12 whereby said sleeve 11 is maintained in position within the tubular element 8. Freely rotatable within this sleeve 11 is the wind mill shaft 13 between which and the upper end of said sleeve 11 are roller bearings 14 for obvious purposes.

Supported upon said flange 7 of the tubular element 8 is a gear casing 15 through which extends said shaft 13, this gear casing having a free rotary movement upon the upper end of the skeleton frame 5 through the medium of ball bearings 16. Extending longitudinally through said gear casing 15 is a shaft 17 that is equipped at its front end with a wind wheel 18 this shaft being further provided with a crown gear 19 within said casing 15 it being of course understood that this gear is keyed to said shaft 17. Fixed to the bottom wall of the casing at a point slightly forwardly of said crown gear 19 is a vertical stub shaft 20 upon which is a spur gear 21 in mesh with the crown gear 19 this spur gear being formed with a spider 22 upon which is a ring gear 23 within which extends a spur gear 24 upon the upper end of said shaft 13 the teeth of this spur gear obviously being in mesh with the teeth of said ring gear as more clearly shown by the top plan view, Fig. 2.

In view of this specific form of gearing it will at once be appreciated that the shaft 13 will be rotated at extreme high speed even though the speed of the wind wheel 18 be relatively low.

Pivoted at 25 to a U-bracket 26 that is carried by the rear wall of the gear casing 15 is a conventional form of vane 27 to which is connected one end of a cable 28 which extends downwardly through said tubular member 8 whereby this vane may be moved to a position parallel with the longitudinal axis of said wind wheel 18 for subsequently stopping rotation of the wheel whenever desired.

With more particular reference to Figures 4, 5 and 6 respectively wherein there is detailed the wind wheel structure per se 29 indicates the wheel blades that are slightly arcuate shaped as shown in Figure 5. These blades are pivoted at their inner and outer ends and at opposite sides thereof as indicated at 30 between inner and outer pairs of ring members 31 and 32 respectively. The rings of each pair are normally drawn together through the medium of a desirable number of retractile springs 33 whereby when the wind pressure is not relatively great the blades 29 will be moved to such a position as to present a great area to said wind pressure for consequently rotating said wind wheel at a desirable speed. Obviously when the wind pressure becomes great the force of the same will naturally tend to move said vanes in an opposite direction thereby reducing the area of these blades to the wind pressure which will manifestly maintain the wheel at uniform speed at all wind pressures.

These inner and outer pairs of ring members 31 and 32 are maintained in rigid spaced relation with each other by a desirable number of frame elements 34 which frame elements are also pivoted at their inner and outer ends and at their opposite sides between said ring members as more clearly shown in Figure 5, the inner ends of these frame members extending through the inner pair of ring elements 31 and being positioned within sockets formed within a relatively elongated sleeve 35 and a collar 36 that has free sliding and rotary movement upon the lower end of said sleeve 35. The sleeve 35 is manifestly to be keyed to the projecting end of the before mentioned horizontal shaft 17 within the gear casing 15.

From the above it will at once be apparent that I have provided a highly novel and more effective wind wheel construction wherein the same will be rotated at a relatively uniform speed irregardless of the wind pressure.

In view of the above description when considered in conjunction with the accompanying drawings it will at once be apparent that I have provided a highly novel, simple and durable form of wind mill pump the nature of the same being such that it may be knocked down at will for repairing or renewing any of the parts the wind mill pump being further of such a character as to answer all of the requirements for a successful commercial use.

Minor changes may be made without departing from the spirit and scope of the appended claim.

Having thus described my invention what I claim as new and desire to secure by Letters Patent is:—

In a wind mill pump of the class described, a wind wheel structure, said wheel embodying inner and outer pairs of radially spaced rings, the rings of each pair being spaced apart, radially disposed blades arranged between the pairs of rings and pivotally connected thereto to provide an assembled structure, said blades being transversely bowed, coiled springs arranged between and connected with the rings of the pair, radially disposed rods extending from the inner to outer pair of rings and provided at their outer ends with a crank arm pivotally connected with the outer ring, said springs serving to yieldably resist movement of the blades to a predetermined position, and said rods serving to maintain the rings against collapsing.

In testimony whereof I affix my signature.

ROBERT E. BALLOW.